Sept. 14, 1954     L. H. ZEUN     2,688,940
MACHINE FOR MOLDING PLASTIC ARTICLES
Filed March 22, 1951     3 Sheets-Sheet 1

INVENTOR.
Louis H. Zeun
BY
Luther W Hawley
ATTORNEY

Sept. 14, 1954  L. H. ZEUN  2,688,940
MACHINE FOR MOLDING PLASTIC ARTICLES
Filed March 22, 1951  3 Sheets-Sheet 2

INVENTOR.
LOUIS H. ZEUN.
BY
Luther W Hawley
ATTORNEY

Sept. 14, 1954      L. H. ZEUN      2,688,940
MACHINE FOR MOLDING PLASTIC ARTICLES
Filed March 22, 1951      3 Sheets-Sheet 3
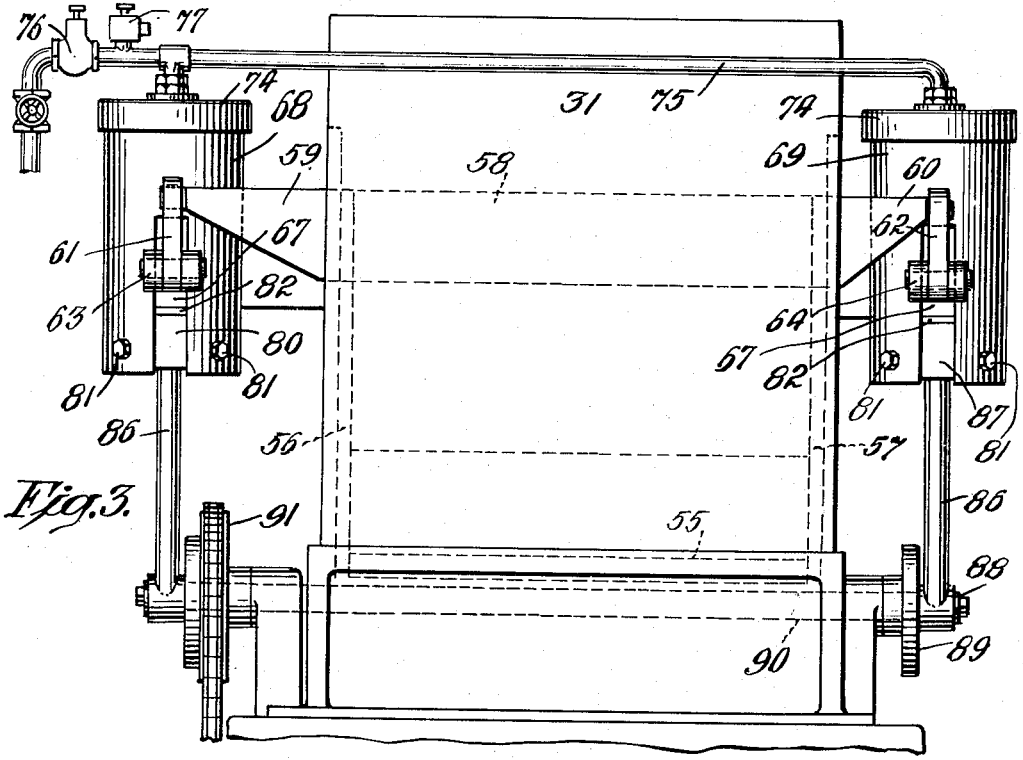
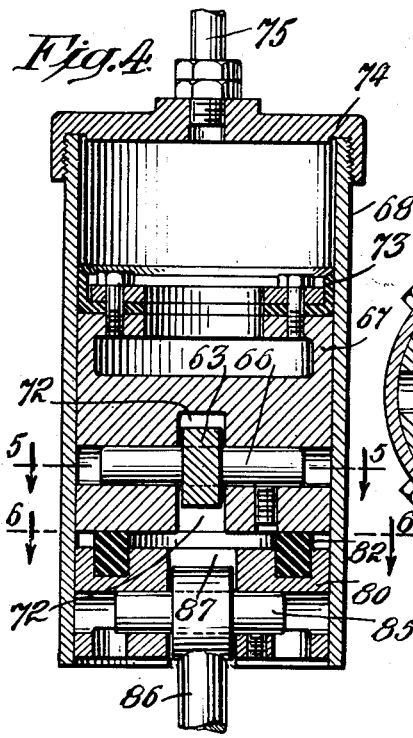
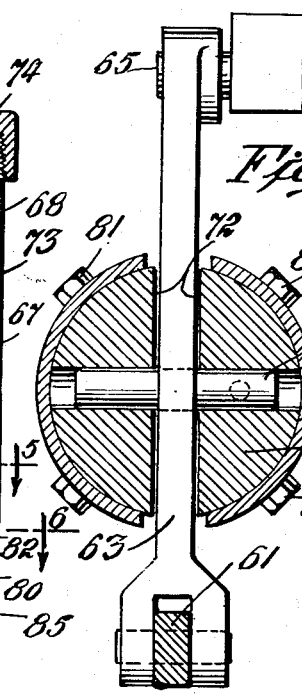
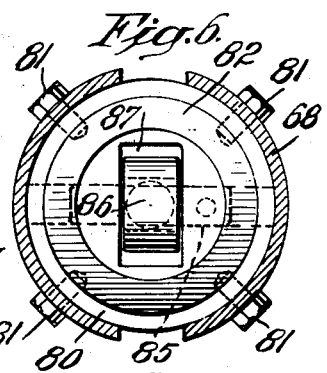
INVENTOR.
LOUIS H. ZEUN
BY Luther W. Hawley
ATTORNEY Patented Sept. 14, 1954

2,688,940

UNITED STATES PATENT OFFICE 2,688,940

MACHINE FOR MOLDING PLASTIC ARTICLES

Louis H. Zeun, Naugatuck, Conn., assignor to Peter Paul, Inc., Naugatuck, Conn., a corporation of Delaware Application March 22, 1951, Serial No. 216,995

5 Claims. (Cl. 107—8)

This invention relates to a machine for molding plastic articles, such as candy molding machines.

The particular machine in connection with which the improvement has been developed and worked out, is the candy molding machine illustrated in Patent No. 2,000,027. In this machine the candy filling is pressed from a hopper by a ram or plunger into dies or mold cavities in the periphery of a drum or carrier.

In order to get a uniform product, the filling or plastic substance must be fed under uniform pressure whether the candy or filling in the hopper is at one level or another. In other words, the pressure on the ram and on the candy or plastic filling engaged and fed by the ram must be always maintained the same.

This invention has for its salient object to provide means for pressing or feeding a plastic substance or candy into molds or dies so constructed that a uniform pressure will be maintained on the feeding or pressing means.

Another object of the invention is to provide a machine of the character described, so constructed and arranged that the production per machine will be materially increased and the product will be uniform.

Further objects of the invention will appear from the following specification taken in connection with the drawings which form a part of this application, and in which:

Fig. 3 is an elevational view, partly broken away, at right angles to Fig. 2 and showing the hopper feed;

Fig. 4 is an enlarged sectional elevation of one of the cylinders; and

Figure 1:
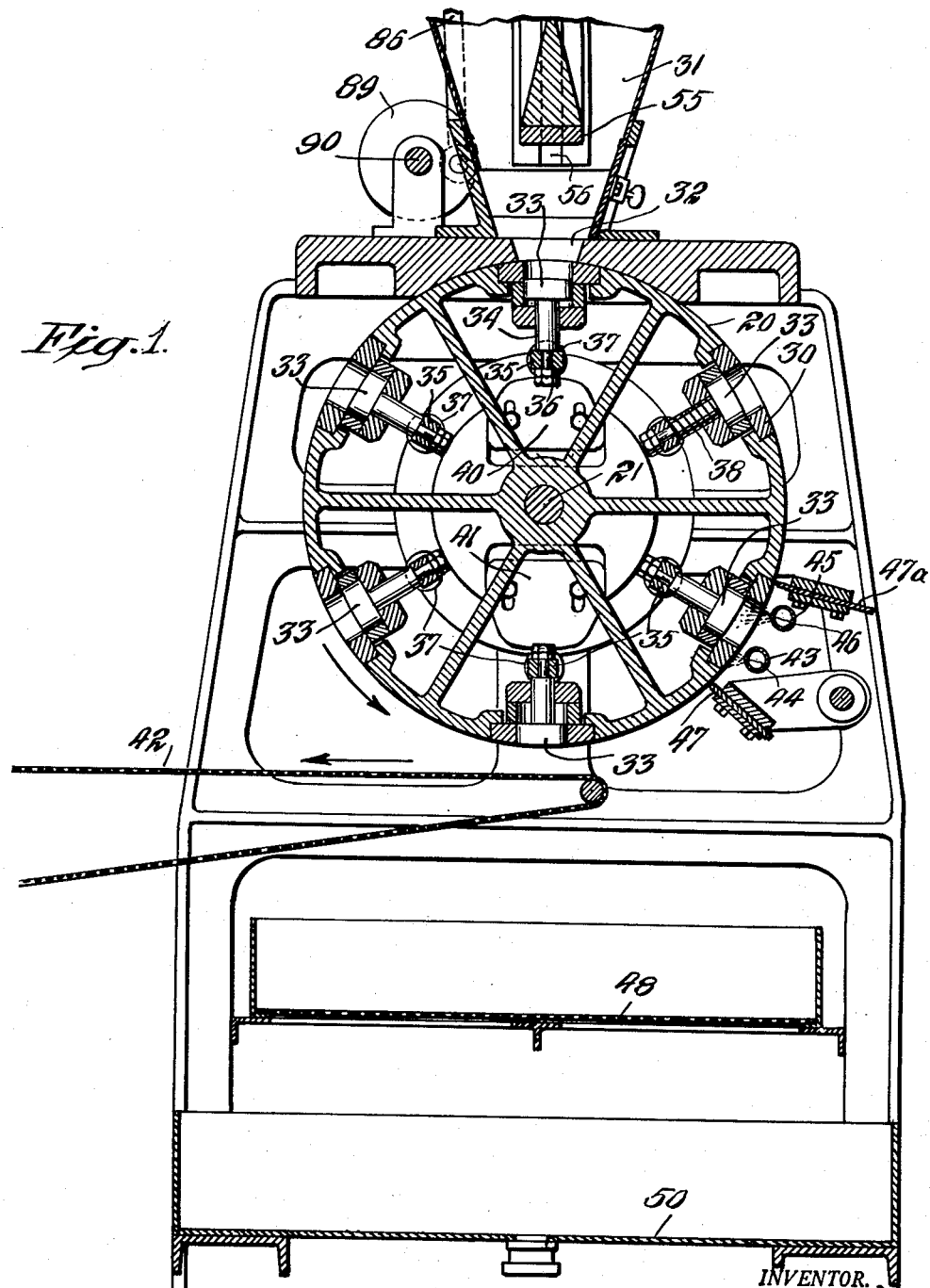
Fig. 1 is a vertical, sectional elevation through the machine showing the hopper, drum and discharge belt.
Figure 2:
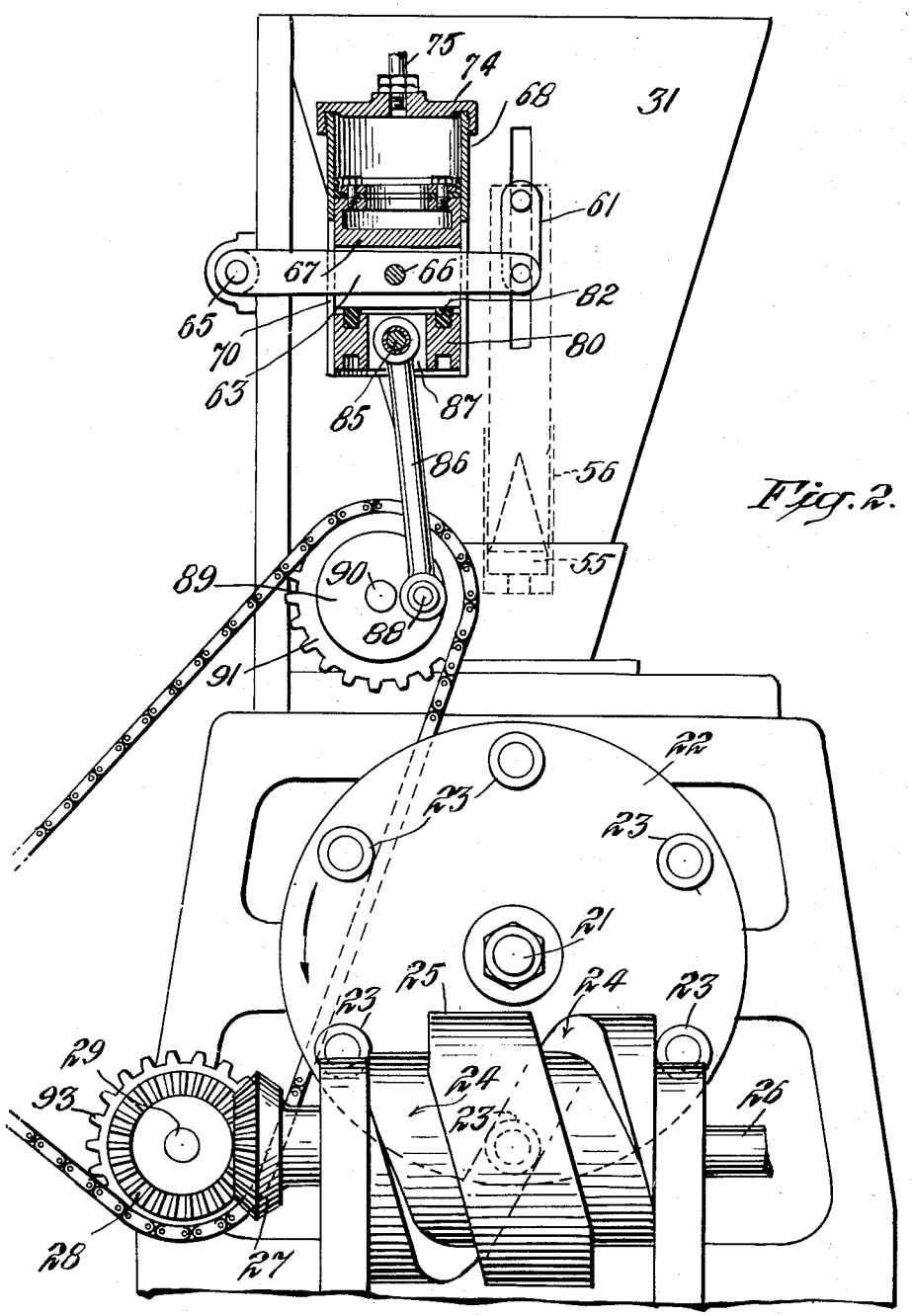
Fig. 2 is an end elevation showing the drive for the drum and showing the hopper feed control cylinder in section.

Figs. 5 and 6 are sectional elevations taken substantially on lines 5—5 and 6—6 of Fig. 4, looking in the direction of the arrows.

The machine particularly illustrated in the drawings is similar to that shown in Patent No. 2,000,027 above referred to and comprises a drum or cylinder 20 mounted on a shaft 21. Shaft 21 has also mounted thereon a disk 22 having a plurality of rollers 23 mounted thereon.

The rollers 23 engage a spiral groove 24 in a worm 25 on a shaft 26, which is driven by a bevel gear driving connection 27, 28 from a shaft 29, which is the main drive shaft and is driven by any suitable source of power.

The drum 20 has mounted in its periphery a plurality of candy molds or dies or die bars 30 having openings to receive the candy filling or plastic material from the hopper 31 mounted above the drum and having a discharge opening or port 32 which is adapted to register with the dies.

The bottoms of the dies or molds are closed by plunger heads 33 mounted on plungers 34. The plungers 34 of each set are mounted on a horizontal bar 35 secured by bolts 36 and each bar 35 carries rollers 37. Each plunger 34 has a spring 38 which engages bar 35 and normally forces the plungers inwardly to dispose the plunger heads 33 inwardly of the mold cavity 30. The positions of the heads in the mold filling position are controlled by adjustable cams 40 which engage the rollers 37 on the ends of bars 35.

When the molds reach discharging position at the bottom of the drum travel, the rollers 37 engage cams 41 which cause the plunger heads 33 to eject the candy filling from the mold cavities onto a belt 42.

The structure above described is illustrated in detail in the patent above referred to and further illustration in this application is not deemed necessary.

After the material has been discharged from the mold cavities, the drum periphery and molds are washed and cleansed by water or liquid spray from a pipe 43 which extends across the width of the drum and has a series of spray openings 44 to direct the water against the drum and into the mold cavities. To prevent the liquid from running downwardly on the drum, a wiper blade 47 engages the drum periphery below the spray pipe 43. Above the pipe 43 is mounted an air pipe 45 having openings 46 adapted to direct air against the drum and into the mold cavities. The air may be heated, if desired.

A scraper blade 47a is mounted above the pipe 45 and engages the drum periphery to remove therefrom any residue of candy filling. Any material removed by the water spray or wiper and scraper blades drops into a tray 48 disposed below the drum. The liquid drains through the perforated tray bottom into a pan 50.

The salient feature of the present invention resides in the pressure feed for the filling from the hopper into the mold cavities. It is essential for a uniform product that this feed be accomplished under uniform pressure. In the patent above referred to, an effort was made to accomplish this by springs in the links which actuate the hopper ram, but although this was operative it did not accomplish feed under uniform pressure as the raising of the level of the material in the hopper compressed the springs which thereby exerted greater force, thus increasing the pressure on the filling in the hopper. In the present invention this has been overcome and this feature will now be described.

The material in the hopper is fed downwardly through the port 32 by a ram 55 which is slidably mounted in guideways 56 and 57. The ram is actuated by a bar 58 having ends 59 and 60 which extend through the ends of the hopper 31. The ends 59 and 60 are engaged by links 61 and 62, which in turn engage levers 63 and 64 mounted on fixed pivots 65.

Each lever 63, 64 is pivoted intermediate its ends at 66 to a piston 67 slidably mounted in one of a pair of cylinders 68, 69. The levers 63, 64 extend through slots 70, 71 in each cylinder and are disposed in a slot 72 in the piston 67.

The top of each piston 67 has a cup 73 of leather or other suitable material.

The top of each cylinder 68, 69 is closed by a cap 74 and to each cap is connected an air pressure pipe 75 which is connected to a source of air pressure and has a pressure control valve 76 and a pressure relief valve 77 adapted to regulate the pressure and maintain uniform pressure in the cylinders 68, 69 on the piston 67. Thus a uniform pressure is maintained on the ram.

The bottom of each cylinder 68, 69 is closed by a plug 80 which is secured in the cylinder by bolts 81. A buffer ring 82 of rubber or suitable cushioning material is mounted in the plug 80.

Each plug 80 is pivoted by a pivot pin 85 to the upper end of a link 86, the upper end of each link being disposed in a recess 87 in the bottom of the plug 80. The lower end of each link 86 is pivoted to a crankpin 88 on a crank disk 89 mounted on a shaft 90.

The shaft 90 has mounted thereon a sprocket wheel 91, which is driven by a chain, which in turn is driven from shaft 29 by sprocket wheel 93. The actuation of the links 86 raises and lowers the cylinders 68, 69 and through the air pressure in the cylinders actuates the pistons 67, levers 63, 64, bar 60 and ram 55, thus feeding the candy filling or plastic material into the molds in the drum. This drive is so timed that the ram is lowered whenever a set of mold cavities is disposed below the hopper discharge port 32.

It is understood that the hopper will be at all times filled to a level at least above the upper limit of movement of the ram and under full operating conditions the hopper will be maintained substantially full.

Although one specific embodiment of the invention has been particularly shown and described it will been understood that the invention is capable of modification and that changes in the construction and in the arrangement of the various cooperating parts may be made without departing from the spirit or scope of the invention, as expressed in the following claims.

What I claim is:

1. In a machine for feeding highly viscous plastic material into mold cavities, a hopper having a discharge opening, feeding means including a ram in the hopper for forcing material from the hopper through the discharge opening and into the cavities, operating means for exerting reciprocating pressure on the ram and pressure control coupling means interposed between the operating means and the ram for maintaining a uniform and predetermined constant operating pressure on the ram.

2. In a machine for feeding highly viscous plastic material into mold cavities, a hopper having a discharge opening, feeding means including a ram in the hopper for forcing material from the hopper through the discharge opening and into the cavities, operating means for exerting reciprocating pressure on the ram and pneumatically controlled coupling means interposed between the operating means and the ram for maintaining a uniform and predetermined constant operating pressure on the ram.

3. In a machine for feeding highly viscous plastic material into mold cavities, a hopper having a discharge opening, feeding means including a ram in the hopper for forcing material from the hopper through the discharge opening and into the cavities, operating means for exerting reciprocating pressure on the ram including positive driving mechanism, and pressure control coupling means interposed between the driving mechanism and the ram for maintaining uniform and predetermined constant operating pressure on the ram.

4. In a machine for feeding highly viscous plastic material into mold cavities, a hopper having a discharge opening, feeding means including a ram in the hopper for forcing material from the hopper through the discharge opening and into the cavities, operating means for exerting reciprocating pressure on the ram, said operating means including positive driving mechanism, and pressure control coupling means interposed between the operating means and ram for maintaining a uniform and predetermined constant operating pressure on the ram, said coupling means including pneumatic cylinders connected to the positive driving mechanism, pistons in the cylinders connected to the ram and means for conducting compressed air to the cylinders above the pistons.

5. In a machine for feeding highly viscous plastic material into mold cavities, a hopper having a discharge opening, feeding means including a ram in the hopper for forcing material from the hopper through the discharge opening and into the cavities, operating means for exerting reciprocating pressure on the ram, pneumatically controlled coupling means interposed between the operating means and the ram for maintaining a uniform and predetermined constant operating pressure on the ram, means conducting compressed air to the pneumatically controlled coupling means and a pressure control valve and a pressure relief valve in the compressed air conducting means.

References Cited in the file of this patent

UNITED STATES PATENTS

| Number | Name | Date |
|---|---|---|
| 222,135 | Hoffman | Dec. 2, 1879 |
| 716,459 | Mueller | Dec. 23, 1902 |
| 928,730 | Bausman | July 20, 1909 |
| 1,053,954 | Lentz | Feb. 18, 1913 |
| 1,340,805 | Thomson | May 18, 1920 |
| 1,559,729 | Morris | Nov. 3, 1925 |
| 1,839,731 | Baum | Jan. 5, 1932 |
| 1,937,904 | Mosher | Dec. 5, 1933 |
| 2,000,027 | Kazajian | May 7, 1935 |
| 2,208,905 | Dremmling et al. | July 23, 1940 |